No. 822,933. PATENTED JUNE 12, 1906.
J. & M. EVANS.
TIRE SETTER.
APPLICATION FILED FEB. 1, 1906.
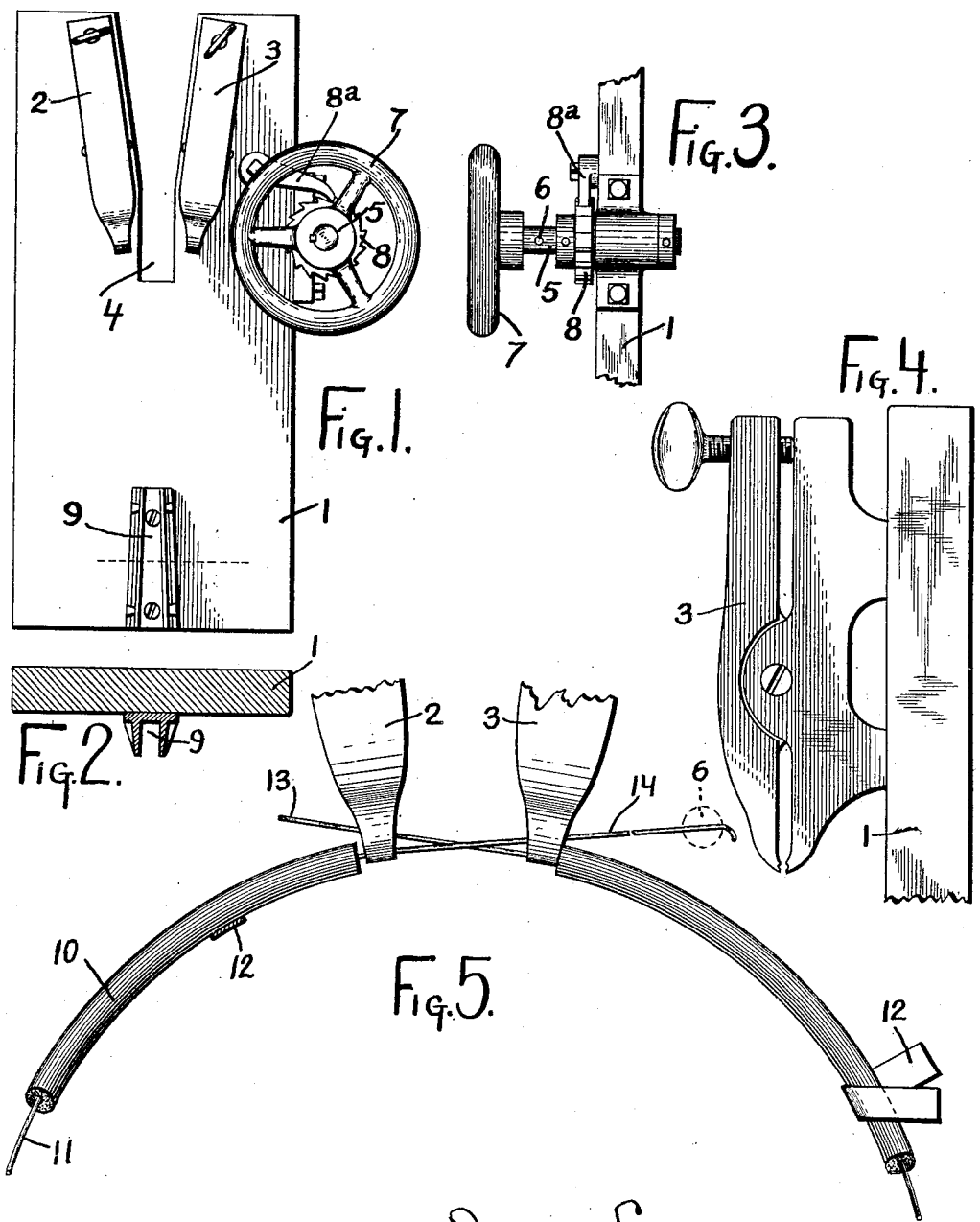
Witnesses:
Elmer R. Shipley.
M. S. Belden.
Jesse Evans
Minor Evans
Inventors
by James W. See
Attorney

UNITED STATES PATENT OFFICE.

JESSE EVANS AND MINOR EVANS, OF HAMILTON, OHIO.

TIRE-SETTER.

No. 822,933.     Specification of Letters Patent.     Patented June 12, 1906.

Application filed February 1, 1906. Serial No. 298,919.

*To all whom it may concern:*

Be it known that we, JESSE EVANS and MINOR EVANS, citizens of the United States, residing at Hamilton, Butler county, Ohio, have invented certain new and useful Improvements in Tire-Setters, of which the following is a specification.

There is a general class of machines for binding tubular tires upon the wheels of the lighter class of vehicles, such machines embodying a pair of wire-holding clamps and a wire-straining device.

Our invention pertains to certain details of construction in this class of machines, and the invention will be readily understood from the following description, taken in connection with the accompanying drawings, in which—

Figure 1 is a front elevation of our improved tire-setter; Fig. 2, a sectional plan of the machine; Fig. 3, a portional side elevation of the machine; Fig. 4, a portional side elevation of the machine on an enlarged scale; and Fig. 5 a front elevation of the functional portions of the clamps, in conjunction with the wire and tire upon which they work.

In the drawings, 1 indicates a flat upright board adapted to be secured against a support or in a vise at convenient working height; 2, a clamp firmly secured to the upper portion of the board and presenting narrow clamping-jaws downwardly at some distance from the top of the board in such position as to clamp the wire lying parallel with the front face of the board; 3, a similar clamp disposed alongside the first one, a space being left between the lower ends of the two clamps, this space widening upwardly; 4, a deep notch extending from the upper end of the board downwardly between the two clamps and to a point below the lower ends of the clamps; 5, a rotary spindle journaled in a bearing firmly secured to the edge of the board; 6, a hole diametrically through the spindle in position to be substantially in a horizontal plane common with that of the lower ends of the clamps and in a vertical plane corresponding substantially with that of the gripping-space between the jaws of the clamps; 7, a handle on the spindle, by means of which the spindle may be turned; 8, a ratchet fast on the spindle; 8ª, a pawl supported by the board and engaging the ratchet; 9, a grooved clamp formed in a casting secured to the face of the board below the notch 4, the groove of said clamp being open at the top and bottom and front and extending vertically and being wider at the bottom than at the top; 10, the rubber tire to be applied to the wheel, and 11 the wire disposed within the bore of the tire to serve in securing it to the wheel.

In using the apparatus the tire is cut to proper length, which length should exceed the circumference of the felly by about one-half inch for each foot of wheel diameter. Within the tire is inserted the wire of such length as to project three and one-half or four inches beyond one end of the tire and a few inches more beyond the other end of the tire. The shorter projecting end of the wire is then to be clamped lightly in the gripping-points of the jaws of the right-hand clamp, the rubber tire coming against the right-hand side of the jaws and the extra wire projecting idly through the left-hand clamp above the gripping-points of the jaws of that clamp. The other end of the wire is to be passed through between the gripping-points of the left-hand clamp and clamped lightly, the extra wire of this end passing onward idly through the right-hand clamp above the gripping-points of its jaws and then through the hole in the spindle, the wire being preferably given a sharp bend just beyond the spindle in order that it may not slip back through the spindle. The projecting end 13 of the wire is now to be firmly grasped with pliers and pulled to the left until the rubber abutting against the right-hand clamp has been compressed to such extent as to consume about one-half of the excess length to which the rubber has been cut. This compression of the rubber will not be localized at the right-hand clamp, but will be distributed circumferentially for some distance away from the clamp. The right-hand clamp is now to be firmly tightened, thus securely gripping the wire 13, but leaving the wire 14 free so far as the right-hand clamp is concerned. The wheel is now to be placed within the tire, a few short leather straps 12 being interposed between the tire and felly, these straps being preferably equally distributed around the wheel. The spindle is now to be turned so as to wind up on the wire 14 and draw it through the left-hand clamp, the left-hand portion of the rubber coming against the outer portion of this clamp and becoming compressed. The turning of the spindle is to be continued until the wire has been put under desired maximum strain, the degree of which will be read ily arrived at by experience. The left-hand clamp is then to be firmly tightened, thus leaving the rubber tightly bound to the felly, the ends of the rubber being separated by the distance represented by the distance between the exterior of the two clamps, the rubber at each side of the gap and for considerable circumferential distance therefrom being under severe compression. Wire 14 is then to be severed between the spindle and the right-hand clamp. By the use of pliers or other suitable twisting-tool applied to the crossing of the two wires between the clamps the wires are then twisted together, two or three turns being sufficient for ordinary cases. Both clamps are now to be loosened, and the wheel, with the attached wire, is to be removed and the ends of the wires projecting beyond the twist are to be cut off.

As soon as the wheel is removed from the clamp the reaction of the rubber will cause its ends to move toward the twisted juncture of the wire; but the friction of the rubber in the felly will be too great to permit the rubber by its own action to close the gap between its ends. The operator now places the rim of the wheel in the grooved clamp 9 with the tire-gap upward and bears against the opposite point of the wheel-rim with his body, pulling the tire upwardly in the grooved clamp until it is pinched therein. He then pulls circumferentially upon the leather strap between the grooved clamp and the tire-gap, thus working the rubber forward toward the gap until its end is at about the middle of the twisted splice. The next strap beyond the grooved clamp may be called into play at an earlier or later stage in alternation with the first-mentioned strap in working the rubber to the desired point. The straps upon this side of the wheel may now be drawn out. The wheel is then to be reversed in the grooved clamp and the other straps manipulated till the second end of the rubber is brought up over the splice and into compressive abutting engagement with the first end, leaving the splice of the wire nicely covered by the rubber and leaving the rubber under fairly equal tangential compression all the way around the wheel. Just prior to the abutting of the ends of the rubber there may be, if desired, a little rubber cement applied to the ends, so that a fairly homogeneous joint is formed.

We claim—

In a tire-setter the combination, substantially as set forth, of an upright flat support having a notch in its upper end and an upwardly-narrowing groove opening outwardly below the notch, a pair of separated clamps fixedly secured to the support at the sides of the notch and presenting gripping-jaws downwardly above the level of the base of the notch at each side thereof, a perforated spindle journaled on the support at one side of the pair of clamps, a ratchet on the spindle, and a pawl pivoted on the support and engaging the ratchet.

JESSE EVANS.
MINOR EVANS.

Witnesses:
ELMER R. SHIPLEY,
M. S. BELDEN.